(12) United States Patent
Sato et al.

(10) Patent No.: US 11,273,530 B2
(45) Date of Patent: Mar. 15, 2022

(54) MACHINE TOOL SYSTEM

(71) Applicant: MAKINO MILLING MACHINE CO., LTD., Tokyo (JP)

(72) Inventors: Motohiko Sato, Aiko-gun (JP); Taiichiro Washizaki, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 442 days.

(21) Appl. No.: 16/461,346

(22) PCT Filed: Nov. 16, 2016

(86) PCT No.: PCT/JP2016/084001
§ 371 (c)(1),
(2) Date: May 15, 2019

(87) PCT Pub. No.: WO2018/092222
PCT Pub. Date: May 24, 2018

(65) Prior Publication Data
US 2019/0375065 A1    Dec. 12, 2019

(51) Int. Cl.
*B25J 9/00* (2006.01)
*B25J 11/00* (2006.01)
(Continued)

(52) U.S. Cl.
CPC .......... *B23Q 3/1554* (2013.01); *B25J 9/0084* (2013.01); *B25J 9/0096* (2013.01); *B25J 9/1661* (2013.01);
(Continued)

(58) Field of Classification Search
CPC ....... B23Q 3/1554; B25J 5/007; B25J 9/0084; B25J 9/0093; B25J 9/0096; B25J 9/163;
(Continued)

(56) References Cited

U.S. PATENT DOCUMENTS 10,048,697 B1 * 8/2018 Theobald ............. B65G 41/008
2009/0198370 A1   8/2009 Nishi et al.
(Continued)

FOREIGN PATENT DOCUMENTS

DE   102016106807 A1   10/2016
JP       62-177605        8/1987
(Continued)

OTHER PUBLICATIONS

International Search Report dated Jan. 17, 2017, directed to International Application No. PCT/JP2016/084001; 2 pages.

*Primary Examiner* — Jermie E Cozart
(74) *Attorney, Agent, or Firm* — Morrison & Foerster LLP

(57) ABSTRACT

This machine tool system uses a plurality of mobile robots to convey workpieces to a plurality of machine tools, the machine tool system being provided with: machine tool control unit that issues work requests to the machine tools; a mobile robot control unit that determines workable times for the mobile robots on the basis of the work requests; and a determining unit that compares the workable times which are for the mobile robots and respectively planned by the mobile robots, and causes the mobile robot with the fastest workable time to execute the requested work.

4 Claims, 1 Drawing Sheet

(51) Int. Cl.
  *G05B 19/418*   (2006.01)
  *B25J 9/16*    (2006.01)
  *B23Q 3/155*   (2006.01)
  *B25J 5/00*    (2006.01)
  *B25J 13/00*   (2006.01)

(52) U.S. Cl.
  CPC ....... *B25J 11/005* (2013.01); *G05B 19/41825*
      (2013.01); *B23Q 2003/155421* (2016.11);
      *B25J 5/007* (2013.01); *B25J 9/003* (2013.01);
      *B25J 9/163* (2013.01); *B25J 9/1687* (2013.01);
      *B25J 13/006* (2013.01); *G05B 19/41815*
      (2013.01)

(58) Field of Classification Search
  CPC ...... B25J 9/1661; B25J 9/1687; B25J 11/005;
      B25J 13/006; G05B 19/41815; G05B
      19/41825
  See application file for complete search history.

(56) References Cited

U.S. PATENT DOCUMENTS

| | | |
|---|---|---|
| 2012/0143427 A1 | 6/2012 | Hoffman et al. |
| 2014/0277714 A1* | 9/2014 | Izumi .................... B25J 9/0084 |
| | | 700/248 |
| 2015/0185730 A1 | 7/2015 | Long et al. |
| 2015/0253757 A1 | 9/2015 | Ikeda |
| 2015/0285644 A1 | 10/2015 | Pfaff et al. |

FOREIGN PATENT DOCUMENTS

| | | |
|---|---|---|
| JP | 5-38663 | 2/1993 |
| JP | 6-71693 | 3/1994 |
| JP | 10-297719 | 11/1998 |

\* cited by examiner

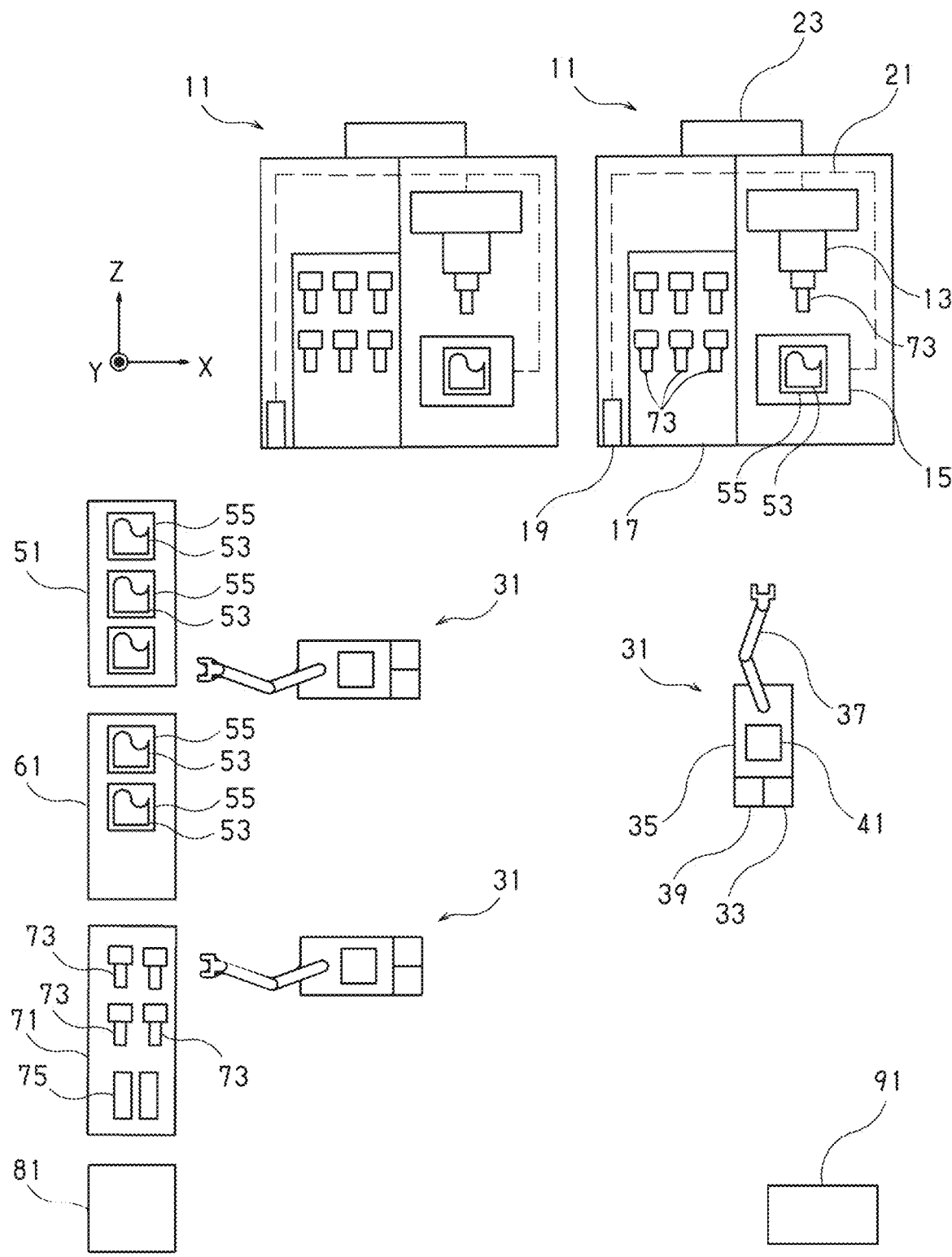

MACHINE TOOL SYSTEM

CROSS-REFERENCE TO RELATED APPLICATIONS

This application is a U.S. national phase patent application of International Patent Application No. PCT/JP2016/084001, filed Nov. 16, 2016, which is hereby incorporated by reference in the present disclosure in its entirety.

FIELD OF THE INVENTION

The present invention relates to a machine tool system including a plurality of machine tools and a plurality of mobile robots.

BACKGROUND OF THE INVENTION

A machine tool machines a workpiece into a desired shape. At that time, the work of attaching the workpiece to the machine tool and the work of unloading the workpiece finished being machined may be performed using robots or unmanned carts. By attaching and unloading workpieces by robots rather than manually, it is possible to automate the operation and raise production efficiency.

PTL 1 discloses a machining scheduling device which, when using conveyor robots to send workpieces to a plurality of machine tools, differentiates between pallets according to the types of the workpieces and dispatches pallets in accordance with a dispatch frequency.

PTL 2 discloses a cart assigning method sending a conveyance command to a cart able to reach a loading point the fastest among the carts belonging to a loading or unloading point when using a plurality of carts to convey steel coils.

Patent Literature

[PTL 1] Japanese Examined Patent Publication No. H06-71693
[PTL 2] Japanese Unexamined Patent Publication No. H10-297719

SUMMARY OF THE INVENTION

When using a machine tool to machine a workpiece, the workpiece is attached and unloaded. Not only the work of conveying the workpiece, but also the work of maintaining the machine tool must be performed. For example, replenishing work for supplying the machine tool with a lubricant for lubricating a drive part of the machine tool becomes necessary. Further, when the chips removed from a workpiece accumulate at the machine tool, the chips have to be carried away from the machine tool. Further, a tool provided at a tool changer of the machine tool becomes worn or breaks due to machining, so the now useless tool has to be removed from the machine tool and a new tool has to be inserted in the tool changer of the machine tool.

However, it is difficult to predict when such maintenance work will become necessary, so it was not possible to incorporate the work into scheduling and automate it. Further, from the viewpoint of preventative measures, the work has to be performed early for ensuring safety. In this case, however, the frequency of maintenance work increases and waste becomes greater. For this reason, such maintenance work has been performed by an operator of the machine tool or a maintenance personnel watching for warnings appearing on a display of the machine tool etc. and if necessary performing the work.

When an operator performs maintenance work, the operator is only able to perform it during the hours he attends work, so when maintenance is required at night or on holidays, it is necessary to automatically suspend work upon an alarm or warning etc. However, the work continues suspended until the operator next arrives, so the operating efficiency of the machine tool is poor.

The present invention is made in consideration of the above situation and has as its object to provide a machining system making mobile robots perform maintenance work at suitable timings when maintenance work is required.

In the present invention, there is provided a machine tool system using a plurality of mobile robots to convey workpieces to a plurality of machine tools. The machine tool system comprises a machine tool control unit issuing work requests to the individual machine tools, a mobile robot control unit determining possible work start times for the individual plurality of mobile robots based on the work requests for the individual machine tools sent out from the machine tool control unit, and a determining unit comparing the possible work start times of the individual mobile robots which the mobile robots respectively plan and making a mobile robot with an earliest possible work start time perform requested work.

Due to this, even without an operator predicting work times of mobile robots in advance, it is possible to determine the possible work start times of various work automatically by the machine tools and mobile robots and make the suitable mobile robots perform work at suitable timings.

In the present invention, furthermore, the work requests each include a workpiece conveyance work request and a maintenance work request. The workpiece conveyance work request is either request for work of attaching workpieces to the machine tools or work of unloading workpieces from machine tools, while the maintenance work request is a request for any one of work removing chips from machine tools, work conveying lubricants and supplying lubricants to operating parts of the machine tools, and work conveying tools and inserting tools into tool storages 17 of the machine tools.

Due to this, it becomes possible to have maintenance work other than the work of conveyance of workpieces such as restocking tools, removing chips, or replenishing lubricants, which used to be performed by operators, be automatically performed by mobile robots.

According to the present invention, it becomes possible to make mobile robots perform maintenance work at suitable timings when maintenance work is required.

BRIEF DESCRIPTION OF THE DRAWINGS

FIG. 1 is a schematic view showing an embodiment of a machine tool system of the present invention.

DETAILED DESCRIPTION OF THE INVENTION

An embodiment of the present invention is shown in FIG. 1. A machine tool 11 is a machining center which has a spindle 13 holding and turning a tool 73 and a table 15 on which a workpiece 53 is carried and uses feed shafts to make the spindle 13 and table 15 relatively move to machine a workpiece by the rotating tool 73. In FIG. 1, the tool 73 and the workpiece 53 are made to move relative to each other by making the table 15 move in the Z-direction and the spindle 13 move in the XY-directions. The machine tool 11 is provided with a tool storage 17 storing a plurality of tools 73. It uses a not shown tool changer to change a tool 73 held at the spindle 13 with a tool 73 in the tool storage 17 and turns the spindle 13 to perform machining. The machine tool 11 is also provided with a bucket under the table 15 which collects the chips removed from the workpiece 53 by the rotating tool 73. The machine tool 11 is also provided with an automatic greasing device 19 supplying to the feed shafts a lubricant for lubricating the feed shafts. Further, the machine tool 11 has a control device 23 for controlling the feed shafts and automatic tool changer or monitoring the status of the automatic greasing device 19 and issuing commands. The control device 23 of the machine tool communicates with mobile robots 31 wirelessly.

Each mobile robot 31 is provided with an unmanned cart 35 and a manipulator 37 attached on the unmanned cart 35 and having three axes or more of freedom. The mobile robot 31 monitors position references emitting radio waves (GPS) or laser light to find its own approximate position and when moving to near a target object positions itself precisely by recognizing the target object or a marker attached to the target object by a camera.

Each mobile robot 31 has a work storage 39 for storing a movement route or work procedure. The operator pushes the mobile robot 31 to move it along a movement route so as to teach the mobile robot 31 the movement route in advance. Further, the operator moves the manipulator 37 of the mobile robot 31 to teach the mobile robot 31 the content of work in advance. The mobile robot 31 stores the taught movement route and work procedure in the work storage 39. At the top part of the unmanned cart 35 of the mobile robot 31, a conveyor table 41 for temporary placement of an object being conveyed is also provided.

At a material storage space 51, pre-machining workpieces 53 are fastened to pallets 55 using respective jigs. A mobile robot 31 can use the manipulator 37 to grab a pallet 55 and move a workpiece 53 together with the pallet 55 onto the conveyor table 41 of the mobile robot 31.

At the product storage space 61, post-machining workpieces 53 are stored while fastened to the pallets 55. A mobile robot 31 collects a workpiece 53 finished being machined together with the pallet 55 from the table 15 of the machine tool 11 and conveys it to the product storage space 61. The operator need only take out a finished product of the post-machining workpiece 53 from the product storage space 61.

The maintenance product storage space 71 stores spare tools 73. The tools 73 used in the machine tool 11 of the present invention are attached to HSK or other tool holders of predetermined shapes for machining center use defined in industrial standards. The shapes of the flange parts of the tool holders are determined by the standards. A mobile robot 31 can use the manipulator 37 to grab a flange part and move a tool 73 together with the tool holder between the conveyor table 41 of the mobile robot 31 and the maintenance product storage space 71.

The maintenance product storage space 71 further stores lubricants. If taking as an example grease as a lubricant, grease is stored in the maintenance product storage space 71 in a state contained in tubes 75 so as to facilitate conveyance. A tube 75 can be connected to an automatic greasing device 19 of the machine tool 11.

The chip disposal place 81 includes a bucket area for stationing empty buckets and a large size bucket for disposal of chips. The mobile robot 31 conveys an empty bucket to the machine tool 11, brings back a bucket filled with chips to the chip disposal place, dumps the chips in the bucket into the large size bucket, and return the emptied bucket to the bucket area.

In the present invention, the machine tool 11 issues work requests. The work requests which the machine tool 11 issues include a workpiece conveyance work request and a maintenance work request.

Workpiece conveyance work is higher in priority than maintenance work. If there is no material for the workpiece 53 to be machined by the machine tool 11, the machine tool 11 cannot perform machining and the work ends up being suspended for a certain time. Therefore, conveyance work has to be performed with priority over maintenance work. The workpiece conveyance work includes the work of conveying a pre-machining workpiece 53 from the material storage space 51 to the machine tool 11 and the work of conveying a post-machining workpiece 53 from the machine tool 11 to the product storage space 61. If the post-machining workpiece 53 is not removed from the machine tool 11, a new pre-machining workpiece 53 cannot be loaded onto the machine tool 11, so the work of conveying a post-machining workpiece 53 is given priority to over the work of conveying a pre-machining workpiece 53.

In maintenance work as well, there is a priority order in the maintenance work. Processing is performed so that work is performed in the priority order. The priority order of work relating to a tool 73 is high. The priority order of work becomes lower for chips and grease, in that order.

Maintenance work includes the work of changing tools 73. The machine tool 11 automatically changes tools 73 of the spindle 13 by commands from a machining program. When returning a tool 73 to the tool storage 17 of the machine tool 11, whether there is some abnormality in the tool 73 such as breakage or wear is judged by using a tool length measuring device (not shown) to measure the length of the tool 73 and thereby detect breakage or wear of the tool 73. If there is some abnormality in the tool 73, the used now unnecessary tool 73 returned to the tool storage 17 of the machine tool 11 has to be replaced with a new tool in the maintenance product storage space. The work of replacing the now unnecessary tool 73 in the tool storage 17 of the machine tool 11 with a new one is not as high in priority as workpiece conveyance work. However, if when the machining program calls up a tool 73, the called up tool 73 for use in machining cannot be prepared, the workpiece 53 cannot be machined and machining will end up being suspended for a time. For this reason, the work of conveying a tool 73 to supply a tool 73 to the tool storage 17 of the machine tool 11 is higher in priority than other maintenance work.

Maintenance work also includes the work of replenishing the lubricants used for the machine tool 11. Here, as a typical example, the lubricant grease used for lubricating the feed shafts of a machine tool will be explained as an example. The machine tool 11 is provided with an automatic greasing device 19. The feed shafts of the machine tool 11 are connected to piping 21 from the automatic greasing device 19. The feed shafts can be supplied with grease by this. There is a sufficient margin of time from when the automatic greasing device 19 discharges grease once to when it next discharges it. Even if the automatic greasing device 19 becomes completely empty and the supply of grease is stopped, grease remains deposited on the feed shafts of the machine tool 11, so the shafts will not immediately break. There is no problem even if postponing the work until the next day. Accordingly, the work of conveying grease or other lubricants and supplying the lubricants to the operating parts of the machine tool 11 is lowest in priority.

Maintenance work also includes the work of disposing of the chips. If the machine tool 11 machines a workpiece 43, chips are produced as waste for disposal. Under the table 15, there is a bucket (not shown). The chips which drop down are collected in the bucket. There is a sensor detecting when the bucket becomes close to full. If the bucket becomes close to full, the bucket is replaced with an empty bucket before it becomes full.

The control device 23 of the machine tool 11 of the present invention monitors the state of its own machine and if necessary issues a work request to the mobile robots 31 by wireless communication. If there is a problem in a tool 73, it issues a work request to bring a new tool 73, if the chips in the bucket will soon fill the bucket, it issues a work request for changing the bucket to an empty one, while when the automatic greasing device 19 sends out an alarm, it issues a work request for changing the tube 75. Further, when the machining finishes, the machine tool 11 issues a work request for unloading the workpiece 53 and loading the material of the workpiece 53 used for the next machining.

Each mobile robot 31 receives work requests from the control device 23 of the machine tool 11. The mobile robot 31 rearranges the received work requests in the priority order, calculates the movement times based on the work times corresponding to the work contents stored in advance and the movement routes stored in advance, and calculates for each work request item the possible work start time when work of the work request can be performed based on the work times and the movement times. It sends out the possible work start time for each work request item calculated by the mobile robot 31 to the determining unit 91 by wireless communication.

The determining unit 91 compares the possible work start times sent from the respective mobile robots 31. The determining unit 91 returns to the respective mobile robots 31 the identification number of the mobile robot 31 having the earliest possible work start time or returns the earliest possible work start time. When the content returned from the determining unit 91 is the earliest possible work start time, the determining unit 91 does not have to identify the individual mobile robots 31. Each mobile robot 31 compares its own possible work start time and the received possible work start time and, if the times match, judges that it itself is in charge of the work. Further, if there are a plurality of mobile robots 31 having the same possible work start times, the determining unit 91 compares the possible work start times of the work which the respective mobile robots 31 next schedule and returns the identification number of the mobile robot 31 having the earliest possible work start time of the next work. If returning not the identification number of the mobile robot 31, but the possible work start time, if the possible work start time of the next work is also sent, a mobile robot 31 can judge if it itself is in charge of the work.

When the identification number of the mobile robot 31 with the earliest work starting time or the earliest work time is returned from the determining unit 91, the mobile robots 31 determine whether they themselves are the corresponding mobile robot 31. The mobile robot 31 in charge of the work incorporates that work into its work schedule, while the other mobile robots 31 delete the work request from their work schedules. The work schedules of the mobile robots 31 are stored in their respective work storages 39.

The determining unit 91 does not have to notify the machine tool 11 of which mobile robot 31 will perform the work. The machine tool 11 need not differentiate among the mobile robots 31 and may make any mobile robot 31 arriving at it to perform work perform the required work.

In the embodiment, the case where a workpiece 53 is attached to a pallet 55 and the pallet 55 is conveyed by a mobile robot 31 between the machine tool 11 and material storage space 51 or product storage space 61 is explained, but it is also possible not to use a pallet 55 but use a manipulator 37 of a mobile robot 31 to directly grab and convey a workpiece 53.

REFERENCE SIGNS LIST

11 machine tool
13 spindle
15 table
17 tool storage
19 automatic greasing device
31 mobile robot
33 mobile robot control unit
35 unmanned cart
37 manipulator
39 work storage
41 conveyor table
51 material storage space
53 workpiece
55 pallet
61 product storage space
71 maintenance product storage space
73 tool
75 tube
81 chip disposal place
91 determining unit

The invention claimed is:

1. A machine tool system using a plurality of mobile robots to convey workpieces to a plurality of machine tools, the machine tool system comprising:
   a machine tool control unit issuing work requests to the individual machine tools;
   a mobile robot control unit determining possible work start times for the individual plurality of mobile robots based on the work requests for the individual machine tools sent out from the machine tool control unit; and
   a determining unit comparing the possible work start times of the individual mobile robots which the mobile robots respectively plan and making a mobile robot with an earliest possible work start time perform requested work.

2. The machine tool system of claim 1, wherein
   the work requests each include a workpiece conveyance work request and a maintenance work request,
   the workpiece conveyance work request is either request for work of attachment of a workpiece to a machine tool or work of unloading the workpiece from the machine tool, and
   the maintenance work request is a request for any one of work of removing chips from the machine tool, work of conveying lubricants and supplying lubricants to an operating part of the machine tool, and work of conveying a tool and inserting the tool in a tool storage of the machine tool.

3. The machine tool system of claim 2, wherein
   the mobile robots each have a manipulator having three axes or more of freedom on an unmanned cart and a work storage storing work which has been programmed or work which has been taught, the mobile robot control unit stores required times taken for work stored in the work storage and calculates the possible work start times of the mobile robots based on the required times, and the determining unit renders judgments based on the possible work start times of the plurality of the mobile robots.

4. The machine tool system of claim 2, wherein the mobile robot control unit calculates the possible work start times of the mobile robots based on a priority order assigned in advance to each of workpiece conveyance work, tool conveyance work, chip removal work, and lubricant conveyance work.

* * * * *